United States Patent Office 3,506,550
Patented Apr. 14, 1970

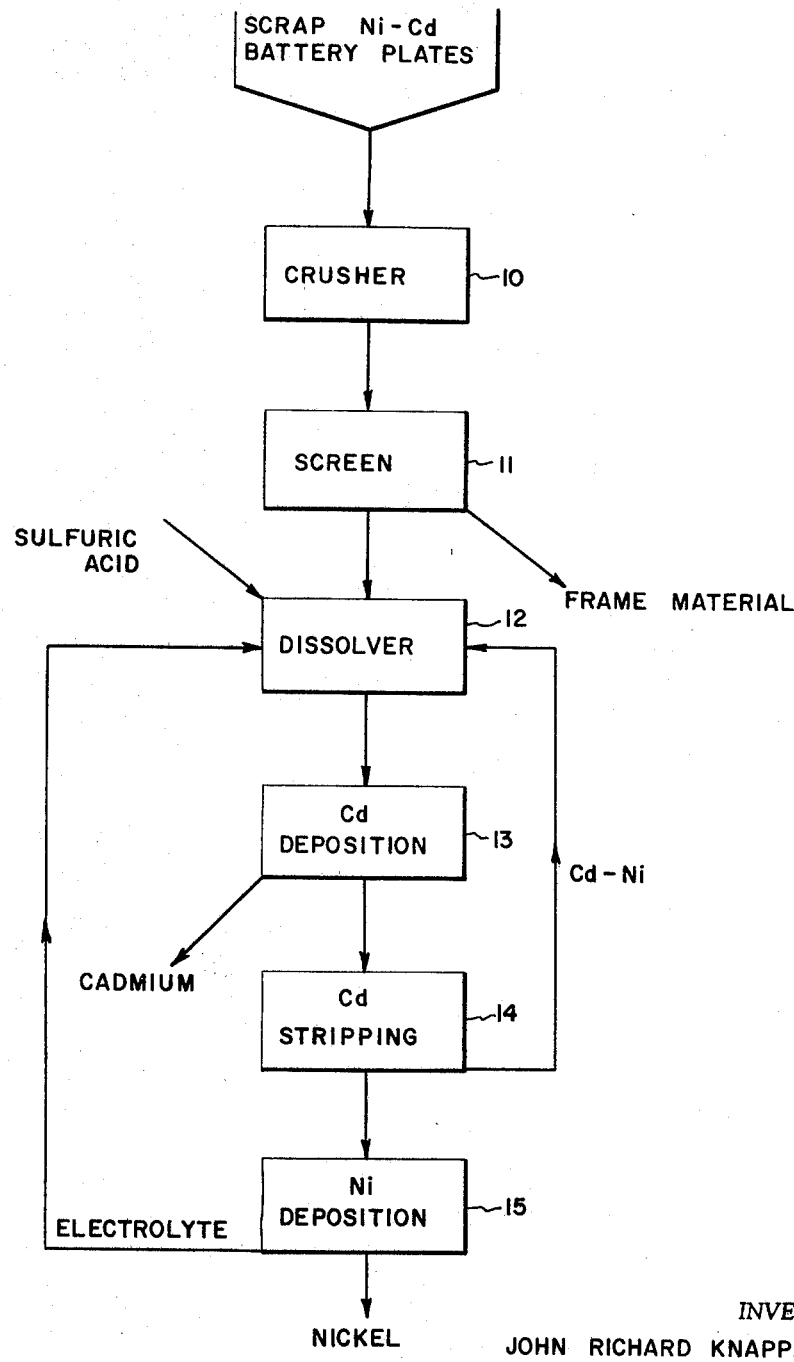

3,506,550
ELECTROLYTIC PROCESS OF RECOVERING NICKEL AND CADMIUM FROM SPENT BATTERY PLATES
John R. Knapp, Jr., Beaver, Pa., assignor to St. Joseph Lead Company, New York, N.Y., a corporation of New York
Filed Oct. 24, 1966, Ser. No. 588,800
Int. Cl. C22d 1/14, 1/22
U.S. Cl. 204—112                                6 Claims

ABSTRACT OF THE DISCLOSURE

Nickel and cadmium are recovered from scrap material, such as battery plates, by dissolving the nickel and cadmium content of the scrap in sulfuric acid and subjecting the solution so obtained to electrolysis below eight volts to deposit metallic cadmium and then above eight volts to deposit metallic nickel. The residual solution is used in the dissolution of further nickel and cadmium scrap.

---

This invention is directed to the recovery of values from scrap material containing nickel and cadmium. It is particularly useful in the recovery of nickel and cadmium from nickel-cadmium battery scrap which contains cadmium hydroxide and/or oxide bonded to sintered nickel. Such scrap material typically contains cadmium in amounts varying from about 10% to about 50% by weight of the scrap and nickel in amounts varying from about 20% to about 55% by weight of scrap.

I have found that an economical and effective separation of the metal valves can be attained by dissolving the scrap, preferably in the form of fines obtained by crushing and screening the scrap, in sulfuric acid and subjecting the solution thus obtained to electrolysis successively at a voltage in the range of 3 to not more than 8 volts to deposit cadmium and at a voltage above 8 volts to deposit nickel. The preferred voltage for the cadmium deposition step is 4 to 5 volts.

The concentration of the sulfuric acid used in dissolving the metal values may vary over a wide range, the rate of solution increasing, in general, with increasing concentration. Acid concentrations from 25 to 30 grams per liter are particularly suitable and sufficient excess acid is preferably used to give a final acid concentration of from 5 to 10 grams per liter.

Typical concentrations of metal values in the solutions are from 5 to 30 grams per liter of nickel and from 10 to 20 grams per liter of cadmium at the start of the cadmium deposition operation which is carried out at a potential below 8 volts and preferably at from 4 to 5 volts. The electrolysis is preferably carried out at these voltages until the cadmium content of the solution is from 1 to 2 grams per liter, the cadmium content thereafter being reduced to below 0.5 gram per liter in a stripping operation which may be carried out at a somewhat higher voltage and results in a mixed deposit of cadmium and nickel which is recycled to the dissolution operation.

The solution is then electrolysed at 8 to 10 volts to deposit nickel, resulting in a solution containing typically 10 to 40 grams per liter of sulfuric acid, 1 to 5 grams per liter of nickel and less than 0.5 gram per liter of cadmium which is returned to the dissolving operation after fortification as necessary with sulfuric acid.

The accompanying drawing is a flow sheet of a typical process for recovering nickel and cadmium from nickel-cadmium battery scrap.

The battery plates are fed to a crusher 10. Frame material is screened out by screen 11, the fines containing, for example, about 60% by weight of nickel and about 30% by weight of cadmium is fed to dissolver 12 with sufficient sulfuric acid including electrolyte liquor from the electrolysis operation to produce a solution containing about 30 grams per liter of nickel, about 15 grams per liter of cadmium and about 5 grams per liter of sulfuric acid.

The solution is electrolysed at 13 at about 4 volts until the deposited cadmium begins to show detectable amounts of nickel, for example, in the neighborhood of 0.03% nickel by weight. The cadmium thus deposited is removed for use or sale and the solution is further electrolysed at 14 at about 5 volts to deposit cadmium with some nickel until the cadmium content of the solution is below 0.5 gram per liter. The deposited metal is then returned to the process, for example, to dissolving tank 12 and the solution is electrolysed at 15 at, for example, 9 volts until the nickel content is reduced to below 5 grams per liter. The deposited nickel is removed for use or sale and the residual electrolyte is returned to the dissolving tank 12.

Operations 13, 14 and 15 may be carried out in the same or in separate cells.

Suitable electrodes for use in the method of the invention may be made of platinum, platinum clad metals such as platinum clad titanium or tantalum, graphite or plastic impregnated graphite, passivated or regular stainless steel and high nickel alloys.

I claim:
1. A method of recovering nickel and cadmium from nickel and cadmium containing scrap material which comprises dissolving the nickel and cadmium content of the scrap material in sulfuric acid, subjecting the solution thus obtained containing at least two grams per liter of cadmium, at least 5 grams per liter of nickel, and an excess of uncombined sulfuric acid to electrolysis at ambient temperatures at a potential of from three to eight volts to deposit metallic cadmium therefrom and thereafter subjecting the solution to electrolysis at ambient temperatures at a potential from above eight to ten volts to deposit metallic nickel therefrom.
2. A method as defined in claim 1 wherein the scrap material consists of nickel-cadmium battery plates.
3. A method as defined in claim 1 wherein the scrap material consists of the fines obtained by crushing and screening nickel-cadmium battery plates.
4. A method as defined in claim 1 wherein the solution obtained on dissolution of the scrap material contains 10 to 20 grams per liter of cadmium, 5 to 30 grams per liter of nickel, and 5 to 10 grams per liter of uncombined sulfuric acid.
5. A method as defined in claim 1 wherein the residual solution after deposition of cadmium and nickel therefrom is used in the dissolution of further nickel and cadmium containing scrap material.
6. A method as defined in claim 1 wherein after electrolytic deposition of cadmium until the solution being electrolysed contains between 1 and 2 grams of cadmium per liter, the solution is further electrolysed at a potential of not more than eight volts until the cadmium content is less than 0.5 gram per liter, the deposit obtained by such further electrolysis being separately collected and the residual solution being thereafter electrolysed at a potential above eight volts to deposit metallic nickel therefrom.

References Cited

UNITED STATES PATENTS

| | | | |
|---|---|---|---|
| 1,194,438 | 8/1916 | Stevens | 204—50 |
| 1,715,262 | 5/1929 | White | 136—165 |
| 2,595,387 | 5/1952 | Kalling | 204—112 |

(Other references on following page)

FOREIGN PATENTS 1,066,619 4/1967 Great Britain.
1,085,736 10/1967 Great Britain.

OTHER REFERENCES

Newton, Introduction to Metallurgy, pp. 327–329 (2d ed. 1947).

Potter, Electrochemistry, pp. 298–302 (1956).

Vogel, A Text-Book of Quantitative Inorganic Analysis, pp. 84–87, 593–597 (3 ed. 1961).

ALLEN B. CURTIS, Primary Examiner

P. D. ROSENBERG, Assistant Examiner

U.S. Cl. X.R.

136—165; 204—119